United States Patent [19]

Pichat et al.

[11] 4,344,925

[45] Aug. 17, 1982

[54] OZONE WHITENING OF SYNTHETIC GYPSUM

[75] Inventors: Philippe Pichat, Paris; Robert Sinn, Lens, Michel Neil, Annezin, all of France

[73] Assignee: Societe Chimique des Charbonnages, Paris, France

[21] Appl. No.: 225,232

[22] Filed: Jan. 15, 1981

Related U.S. Application Data

[63] Continuation-in-part of Ser. No. 112,023, Jan. 14, 1980, abandoned.

[30] Foreign Application Priority Data

Jan. 12, 1979 [FR] France .................. 79 00772

[51] Int. Cl.$^3$ ............... C04B 11/00; C04B 11/02; C01F 11/46
[52] U.S. Cl. ......................... 423/170; 8/111; 106/109; 156/39; 423/166; 423/264; 423/555
[58] Field of Search ............ 423/555, 166, 170, 264, 423/171, 172; 106/109, 110, 306; 8/111, 107; 156/39

[56] References Cited

U.S. PATENT DOCUMENTS

| | | | |
|---|---|---|---|
| 1,548,358 | 8/1925 | Edwards | 423/170 |
| 2,197,003 | 4/1940 | Mowlds | 423/555 |
| 3,616,900 | 11/1971 | Cecil | 423/264 |
| 3,951,675 | 4/1976 | Krempff | 423/555 |
| 4,113,835 | 9/1978 | Kurandt et al. | 423/555 |

FOREIGN PATENT DOCUMENTS

| | | | |
|---|---|---|---|
| 802105 | 12/1968 | Canada | 423/170 |
| 1420612 | 10/1964 | France . | |
| 2203857 | 5/1974 | France . | |
| 49-28383 | 7/1974 | Japan | 423/555 |
| 3190 | of 1883 | United Kingdom | 423/581 |
| 339797 | 12/1930 | United Kingdom | 423/264 |
| 2032901 | 5/1980 | United Kingdom | 423/555 |

*Primary Examiner*—Gary P. Straub
*Attorney, Agent, or Firm*—Millen & White

[57] ABSTRACT

A process for the whitening of phosphogypsum comprising treating a phosphogypsum in aqueous suspension with an amount of ozone equal to at least 150 parts by weight per million parts by weight of phosphogypsum calculated as $CaSO_4.2H_2O$, the pH of the aqueous suspension being lower than or equal to 3, to yield a whiteness grade of phosphogypsum higher than 75, according to French Standard NF Q 03-038.

9 Claims, No Drawings

OZONE WHITENING OF SYNTHETIC GYPSUM

CROSS REFERENCE TO RELATED APPLICATION

This application is a continuation-in-part of copending application Ser. No. 112,023, filed Jan. 14, 1980, now abandoned.

BACKGROUND OF THE INVENTION

This invention relates to a process for the whitening of synthetic gypsum obtained by reacting phosphate rock with sulfuric acid. In particular, it relates to the treatment of synthetic gypsum with ozone, and to the products produced thereby.

The commercial production of phosphoric acid by reacting sulfuric acid with phosphate rocks results in the formation of by-product gypsum of the formula Ca $SO_4.2H_2O$. The so-obtained gypsum, generally called phosphogypsum, even after purification by washing with water, retains deleterious color-imparting impurities. Therefore, it is not possible to use phosphogypsum in certain fields of application, for example as a filler in the paper industry.

Whereas, after washing with water, phosphogypsum has a whiteness grade in the range of 63 to 70 dependent upon the particular nature of the treated phosphate rock, it is necessary in the paper industry for bulk fillers to have a whiteness grade (measured according to French Standard NF Q 03-038), higher than 75 and coating fillers to have a whiteness degree higher than 86.

To obtain white phosphogypsum, attempts were made to treat phosphogypsum by bleaching agents commonly used, for instance, to treat cellulosic fibers. Unfortunately, treatment of phosphogypsum with bleaching agents such as sodium hypochlorite, calcium hypochlorite, chlorine dioxide, hydrogen peroxide, sodium bisulfite cannot be satisfactorily conducted under industrial conditions. Moreover, difficult handling and pollution problems are associated with the use of these bleaching agents.

SUMMARY OF THE INVENTION

An object of this invention is to provide an improved process for whitening phosphogypsum, and to products produced thereby.

A particular object is to provide a process for obtaining a whiteness grade of phosphogypsum which is acceptable to the paper industry.

Upon further study of the specification and appended claims, further objects and advantages of this invention will become apparent to those skilled in the art.

To attain these objects the phosphogypsum is treated with small amounts of ozone sufficient to impart a whiteness grade higher than 75, whatever the initial color of the treated phosphogypsum.

DETAILED DISCUSSION

In particular, the present invention relates to a whitening process of phosphogypsum wherein a phosphogypsum suspension in an aqueous medium is treated with ozone. According to the process of this invention, phosphogypsum produced by reacting phosphate rock with sulfuric acid is filtered, preferably washed with water and placed in suspension in water, the maximum concentration of phosphogypsum being at most 70 percent by weight and preferably ranging from 30 to 50 percent by weight. For concentrations higher than 70 percent by weight, the suspension cannot be easily handled.

After washing with water, the phosphogypsums have a whiteness grade of at most 70. To increase this whiteness grade to a value equal to at least 76, it is sufficient, according to the present invention, to treat the phosphogypsum with a quantity of ozone equal to 150 parts per million by weight based on the weight of the phosphogypsum, the pH of the aqueous suspension being lower than or equal to 3.

Thus, the improved purification process of the present invention comprises treating phosphogypsum suspended in an aqueous medium at a pH lower than or equal to 3 with ozone in an amount equal to at least 150 p.p.m. (parts per million) of ozone by weight relative to the Ca $SO_4.2H_2O$.

This minimum amount of ozone corresponds to the ozone amount which is actually used in the reaction medium. This amount can differ from the entire amount introduced in the reaction medium inasmuch as part of the ozone introduced in the reaction medium can leak out. Accordingly, in practice, the minimum amount of ozone which has to be used is the difference between the ozone amount which is introduced in the apparatus and the ozone amount which leaks out of the apparatus. For example, when an apparatus having a yield equal to 100 percent is used, the minimum amount of ozone is equal to the ozone actually introduced. Generally, the overall range of ozone amount used in practice is about 150 to 1500 parts per million, based on the weight of Ca $SO_4.2H_2O$.

The pH of the aqueous phase in which phosphogypsum is in suspension is acidic and is lower than or equal to 3. In this way when aqueous suspensions of phosphogypsum contain minor amounts of sulfuric and phosphoric acid it is not necessary to neutralize them.

It is possible to grind the phosphogypsum suspension before or after treatment with ozone, but preferably beforehand to increase the rate of whitening. This grinding step is essential when phosphogypsum is used as filler for the coating of paper. For this application it is necessary that the phosphogypsum have a particular granulometry such that 100% of particles have a size less than 100 microns. This grinding step improves the whiteness grade of phosphogypsum.

The ozone used for the process of the present invention is obtained as a dilute gaseous mixture by introducing a gaseous current containing oxygen into a conventional ozone generating apparatus. An electric discharge can be used, for example, to achieve this reaction. The ozone apparatus provides a gaseous current which is either a mixture comprising oxygen, nitrogen and ozone (obtained for instance by ozonizing air) or a mixture comprising oxygen and ozone.

The ozone content of the gas provided by the ozone apparatus is generally in the range of 2 to 10 grams per 100 liters of gas.

The process of the present invention can be conducted at any temperature at which the phosphogypsum can be in the form of a suspension in water, this temperature being higher than the freezing point and lower than the boiling point of the aqueous phase, and preferably between 0 and 50° C., e.g., at room temperature (20°–30° C.).

Preferably the process of the present invention is conducted under atmospheric pressure; however, it is also possible to perform the process at superatmospheric pressures to increase the rate of reaction.

The process of the present invention can be conducted continuously or discontinuously. The reactors used are those suitable for the absorption of a gas into a liquid, and when the process is conducted continuously, gas and suspension are introduced either countercurrently or co-currently.

As noted hereabove, the phosphogypsum obtained according to the process of the present invention is suitable as filler in the paper industry after filtration, drying and with an optional grinding step.

The phosphogypsum treated by ozone can also be used for the preparation of plaster Ca SO$_4$, ½ H$_2$O and more particularly for the preparation of the hemihydrate. For these applications, the treatment of phosphogypsum by ozone had a surprising effect.

It is known that plasters (hemi-hydrate β; Ca SO$_4$, ½ H$_2$O) prepared by calcination of a phosphogypsum purified only by washing with water are subject to the formation and development of molds on the surfaces thereof.

To avoid this drawback, it is known to add fungicides in the plaster before mixing with water.

It has now been found that plaster (hemihydrate β, Ca SO$_4$, ½ H$_2$O) obtained by calcining phosphogypsum treated by ozone according to the process of the present invention yields, after mixing with water, materials (particularly boards) in which the tendency to mold formation is either decreased, or even eliminated when the whiteness grade of phosphogypsum reaches 82. Thus, the purification process of the present invention yields plasters which do not need large amounts of fungicide, and when the phosphogypsum used has a whiteness grade at least equal to 82, no addition of fungicide at all.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

In a cylindrical reaction vessel (volume 10 liters, height:70 cm) provided with a stirrer, there were introduced 12 kg of an aqueous suspension containing 30 percent by weight of phosphogypsum having a whiteness grade of 64. The suspension was at room temperature and it had a pH of 3. The reaction vessel was stirred and oxygen coming from an ozone apparatus and containing 5 g of ozone per 100 liters of gas was introduced at the bottom of the reaction vessel. The gaseous flow was equal to 100 liters/hour.

The reaction was stopped after one hour. The difference between the ozone amount which was introduced in the reaction vessel and the ozone amount which leaked out the reaction vessel was equal to 600 p.p.m. based on the phosphogypsum contained in suspension. After filtration and drying, phosphogypsum having a whiteness grade equal to 77 was obtained.

COMPARATIVE EXAMPLE 1 BIS

Example 1 was repeated by treating 2 kg of the same aqueous suspension of phosphogypsum as in Example 1 (30 percent by weight and whiteness grade equal to 64) with 18 g of hydrogen peroxide at 110 volumes.

The reaction mixture was stirred for 3 hours at 20° C. at normal pressure; then a part of the suspension was filtered and dried. The treated phosphogypsum had a whiteness grade equal to 69.

The reaction medium which was not treated, was stirred again for two hours. After treatment the obtained phosphogypsum had a whiteness grade equal to 69.5.

EXAMPLE 2

In the same reaction vessel as in Example 1, there was introduced into the bottom of the reactor, an aqueous suspension (pH=3) containing 50 percent by weight of phosphogypsum having a whiteness grade equal to 70. The temperature of the reaction medium was equal to 20° C. The flow of the aqueous suspension was equal to 19 kg/hour and the co-current gaseous flow coming from the apparatus and obtained by introducing an air current in an ozone apparatus was equal to 100 l/h; it contained 3.3 g of ozone per 100 liters.

After steady state was reached, the suspension which flowed out from the overflow of the reactor vessel was filtered. The obtained phosphogypsum was dried; it had a whiteness grade of 76 accomplished by the consumption of 180 parts per million of ozone based on the weight of phosphogypsum.

EXAMPLE 3

Example 2 was repeated except that a phosphogypsum having an initial whiteness grade equal to 65 was treated. By using 500 parts per million of ozone based on the weight of phosphogypsum, a whiteness grade equal to 77 was obtained.

EXAMPLE 3 BIS (COMPARATIVE EXAMPLE)

Example 3 was repeated by using a phosphogypsum having an initial whiteness grade equal to 65 the phosphogypsum suspension having a pH equal to 7. By using 500 parts per million of ozone based on the weight of phosphogypsum a whiteness grade equal to 73 was obtained.

The same phosphogypsum suspension having a whiteness grade equal to 65 was acidified up to pH equal to 3 by using a sulfuric acid solution. After treatment with 500 parts per millions of ozone a phosphogypsum having a whiteness grade equal to 77 was obtained.

EXAMPLE 4

Example 3 was repeated except that a phosphogypsum suspension having of pH of 11 and a whiteness grade of phosphogypsum of 65 was used. By using 700 p.p.m. of ozone based on the weight of phosphogypsum, a whiteness grade equal to 76 was obtained.

EXAMPLE 5

Example 3 was repeated except that the temperature of the reaction medium was equal to 40° C. instead of 20° C. 700 Parts per million of ozone were necessary to raise the whiteness grade of phosphogypsum from 65 to 76.

EXAMPLE 6

Example 2 was repeated (pH=3, temperature=20° C.) by using a phosphogypsum having a whiteness grade equal to 61. 870 Parts per million of ozone based on the weight of phosphogypsum were consumed to obtain a phosphogypsum having a whiteness grade equal to 76.

EXAMPLE 7

Example 3 was repeated. By using 1,300 p.p.m. of ozone the whiteness grade of the obtained phosphogypsum was equal to 82.

EXAMPLE 8

The obtained phosphogypsum in Example 7 had the following particle size: 100% smaller than 150 microns with 7% smaller than 10 microns.

The phosphogypsum was ground in order that 100% of the particles were smaller than 10 microns. The whitness grade of the ground phosphogypsum was equal to 87.

EXAMPLE 9

The phosphogypsum obtained in Example 3 was calcined in order to obtain plaster (hemihydrate β, Ca SO$_4$, ½ H$_2$O). This plaster was used to manufacture a board, and the resultant board had a surface having a decreased formation of mold in comparison with board stocked under the same conditions and manufactured with plaster obtained from phosphogypsum which was not treated according to the process of the present invention.

EXAMPLE 10

The phosphogypsum obtained in Example 7 was calcined in order to obtain plaster.

As described in Example 9, the obtained board had a surface where mold was avoided.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for whitening a phosphogypsum an aqueous suspension of which has a pH higher than 3, comprising acidifying an aqueous suspension of the phosphogypsum to be bleached to pH 3 or lower, and treating the suspension having a pH of 3 or lower with an amount of ozone equal to at least 150 parts by weight per million parts by weight of phosphogypsum calculated as CaSO$_4$.2H$_2$O; thereby producing a whiteness grade of phosphogypsum higher than 75, according to French Standard NF 03-038.

2. A process according to claim 1, wherein the concentration of phosphogypsum in the suspension is at most 70 percent by weight.

3. A process according to claim 2, wherein the concentration of phosgypsum in the suspension is 30 to 50 percent by weight.

4. A process according to claim 1, wherein the ozone treatment is carried out at a temperature of 0°–50° C.

5. A process according to claim 1, wherein the resultant phosphogypsum has a whiteness grade of at least 82.

6. A process according to claim 1, wherein the resultant phosphogypsum has a whiteness grade of more than 86, and is suitable as coating filler for paper.

7. A process according to claim 1, wherein the amount of ozone is 150–1500 parts per million.

8. A process according to claim 1, wherein the phosphogypsum has a particle size of less than 100 microns.

9. A process according to claim 4, wherein said temperature is 20°–30° C.

* * * * *